United States Patent [19]

Chang

[11] 4,412,013
[45] Oct. 25, 1983

[54] EXPANDABLE URETHANE SEALANT COMPOSITIONS

[75] Inventor: Yun F. Chang, Plymouth, Mich.
[73] Assignee: Ford Motor Company, Dearborn, Mich.
[21] Appl. No.: 434,641
[22] PCT Filed: Sep. 20, 1982
[86] PCT No.: PCT/US82/01302
  § 371 Date: Sep. 20, 1982
  § 102(e) Date: Sep. 20, 1982
[51] Int. Cl.³ .................... C08G 18/14; C08G 18/22
[52] U.S. Cl. ........................... 521/121; 521/155; 521/170; 528/57; 528/75
[58] Field of Search .......... 521/121, 155, 170; 528/57, 75

[56] References Cited

U.S. PATENT DOCUMENTS

| | | |
|---|---|---|
| 3,433,752 | 3/1969 | Zagoreu et al. ............. 521/121 |
| 4,073,841 | 2/1978 | Dultgen et al. ............ 264/46.6 |
| 4,145,302 | 3/1979 | Doan ......................... 252/91 |
| 4,146,687 | 3/1979 | Reale ......................... 521/107 |
| 4,263,408 | 4/1981 | Meyborg et al. ............. 521/51 |

FOREIGN PATENT DOCUMENTS

| | | | |
|---|---|---|---|
| 1902311 | 9/1969 | Fed. Rep. of Germany ...... 521/121 |
| 90927 | 12/1958 | Netherlands .............. 521/121 |
| 770632 | 3/1957 | United Kingdom ........... 521/121 |
| 887724 | 1/1962 | United Kingdom ........... 521/121 |
| 2063894A | 6/1981 | United Kingdom . | |

*Primary Examiner*—H. S. Cockeram
*Attorney, Agent, or Firm*—Lorraine S. Melotik; Roger L. May

[57] ABSTRACT

This invention relates to expandable urethane compositions adapted for use as sealants. The composition is characterized in comprising a first component comprising a mixture of a hydroxy functional liquid reactive elastomer and metal salts of organic sulfonates and a second component comprising polyisocyanate. Optionally, the composition may additionally comprise pigments and/or fillers. The foam sealant exhibits excellent flexibility, abrasion and impact resistance, sound deadening properties and advantageously adhesion to oily surfaces.

24 Claims, No Drawings

EXPANDABLE URETHANE SEALANT COMPOSITIONS

TECHNICAL FIELD

This invention relates to expandable urethane compositions adapted for use as sealants in, for example, automotive industry applications requiring the sealing of various body panels or joints. More particularly, this invention relates to two-component expandable urethane sealant compositions which cure by chemical reaction between a first component comprising a mixture of hydroxy functional liquid elastomers and metal salts of an organic sulfonate and a second component comprising polyisocyanate.

BACKGROUND ART

Modern sealants are comprised of pigmented or unpigmented synthetic elastomeric polymers, which, in the non-cured state, constitute pourable or easily extrudable putty-like mastics. When cured, they are transformed into elastomeric materials which seal these structural elements and are able to contract or expand with the motion of the connected elements. They also form a tight barrier against moisture, gases and chemicals.

Such sealants include one-component and two-component compositions whose curing may proceed according to several mechanisms. One type of sealant, urethane sealants, include one-component compositions containing only isocyanate terminated prepolymers that cure by reaction of mixtures and isocyanate to form urea linkages. Two-component urethane sealants are prepared from isocyanate-terminated prepolymers and compounds containing active hydrogens both of which are generally sufficiently fluid to be blended at room temperature. These two component sealants cure by the formation of urethane linkages. Urethane polymers are good candidates for sealant applications because they possess a number of desirable properties including outstanding abrasion resistance, oil resistance, low temperature flexibility, resistance to degradation, excellent elasticity and, consequently, a high recovery. Because of an almost unlimited diversity of raw materials, polyurethanes can be formulated with excellent physical properties including low modulus, with retention of good tear and tensile strength.

Recently sealants which expand when heated have become available. These foam sealants, because they are able to expand to effectively seal a joint, are particularly useful as sealants for irregularly shaped or poorly fitting joints. Flexible urethane foams are generally prepared by incorporating water into the urethane composition. The reaction of the water and the isocyanate generates carbon dioxide which acts as a blowing agent to generate the foam. Alternately, fluorocarbons such as trichlorofluoromethane or other volatile solvents have been incorporated into polyurethane compositions as blowing agents to form flexible foams.

DISCLOSURE OF INVENTION

A novel composition has now been found to generate expandable urethane sealants without the use of water or volatile solvents as blowing agents therein. Such compositions have been found particularly useful as automotive sealants for sealing various body parts. The invention of the subject application is directed to a two-component expandable urethane sealant compositions comprising reactive elastomer and polyisocyanate, characterized in that these compositions comprise a first component mixture comprising liquid reactive elastomer and metal salts of an organic sulfonate and a second component comprising polyisocyanate.

The liquid reactive elastomer (a) has a number average molecular weight ($\overline{M}_n$) of between about 1500 and 15,000, (b) contains pendant hydroxyl groups, and (c) is liquid at between about 20° C. and 25° C. The metal salt of organic sulfonates have the formula:

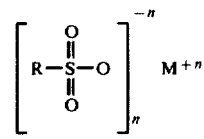

wherein R is selected from $C_8$–$C_{36}$ hydrocarbon groups and M is a metal ion wherein n = 1, 2 or 3. The elastomer and the metal salts of organic sulfonates are present in the mixture in amounts so as to provide between about 20 and about 80 percent hydroxyl groups and between about 80 and about 20 percent sulfonate groups, based on the total of these hydroxyl groups and sulfonate groups. Preferably, the sulfonate is employed dispersed in nonvolatile diluent oil. The polyisocyanate has at least two reactive isocyanate groups per molecule and is included in the composition in an amount so as to provide between about 0.85 and about 1.15 reactive isocyanate groups for each reactive functional group present in the composition either as a hydroxyl group on the liquid reactive elastomer or as a sulfonate group of the metal salts of organic sulfonates. Optionally, the composition may comprise up to about 15 weight percent pigment and/or other fillers based on the total weight of elastomer, sulfonate (dispersion) and polyisocyanate.

After curing the composition at an elevated temperature a foam-type sealant is obtained. The sealant has excellent flexibility, good abrasion and impact resistance, and good sound-deadening properties. Additionally, this composition advantageously exhibits excellent adhesion to oily surfaced substrates, particularly metals, which have not been cleaned prior to application of the sealant composition.

Best Mode

The composition of this invention is used as a two-component system. Component A comprises a uniformly blended mixture of liquid reactive elastomer and metal salts of organic sulfonates along with optional additives such as pigments, fillers, U.V. absorbers, oxidants and other nonreactive materials. Component B comprises a polyisocyanate or a mixture of polyisocyanates. Prior to application of the composition, component A and component B are blended. The composition is in a putty-like mastic form and can be applied to the joint or substrate in a variety of ways, e.g., by means of a putty knife or by extrusion. The sealant composition is then cured, generally for about 5 to 25 minutes at a temperature of between about 120° C. and 180° C., to obtain a foam-type sealant. Selection of optimal cure conditions, including those different from those taught above, would be within the skill of one in the art.

As noted above, the expandable urethane sealant compositions employ, in combination, liquid reactive elastomer having a number average molecular weight ($\overline{M}_n$) between about 1500 and about 15,000, and containing pendant hydroxyl groups, metal salts of organic sulfonate, polyisocyanate or mixture of polyisocycanates, and optionally components such as pigments, fillers, antioxidants or ultraviolet light absorbers. Each component will hereinafter be described in detail.

Liquid Reactive Elastomers

The elastomers suitable for use in Component A of the composition of this invention contain a reactive functionality, in contrast with liquid rubber systems widely used in the area of elastomeric sealants, caulks, binders, potting-encapsulation, and structural adhesives which generally contain no such reactive group. The liquid reactive elastomers useful in the composition of this invention contain pendant hydroxyl groups capable of reacting with the isocyanate during curing. These elastomers are low molecular weight materials having a number average molecular weight ($\overline{M}_n$) of between about 1500 and about 15,000, preferably between about 2000 to 5000, and are liquid at room temperature, i.e., at 20° C.-25° C.

Examples of such liquid reactive elastomers which may be used in the composition of this invention include, but are not limited to, liquid reactive rubbers such as hydroxyl terminated butadiene polymers and hydroxyl terminated butadiene/acrylonitrile copolymers. Generally these liquid rubbers contain, on the average, about 2 hydroxyl groups per molecule so as to be essentially considered a diol elastomer. Hydroxyl terminated butadiene polymer and hydroxyl terminated butadiene/acrylonitrile polymer are commercially available, for example from B. F. Goodrich Chemical Company, Chemical Group, Cleveland, Ohio, under the tradename of Hycar Polymer. Suitable examples of these useful in the subject invention, include 1300X29 (HTBN) and 1300x17 (HTBN).

While butadiene polymers and butadiene/acrylonitrile copolymers have been taught as suitable for elastomers of this invention, other elastomers such as acrylic, polyisobutylene, polyisoprene, polychloroprene and other such polyols may be used as long as they possess the desired hydroxyl functionality and physical limitation as described above. The selection of suitable liquid reactive elastomers (polyols) used in this composition will be well within the capability of one skilled in the art. As will be apparent to one skilled in the art, mixtures of such suitable liquid reactive elastomers may also be used in the composition of this invention.

METAL SALTS OF ORGANIC SULFONATES

Component A of the subject composition also comprises metal salts of organic sulfonates of the general formula:

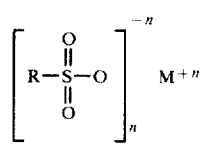

wherein R is selected from $C_8$-$C_{36}$ hydrocarbon groups and M is a cation, n being 1, 2 or 3. Suitable cations include, but are not limited to sodium, calcium, barium, or magnesium, calcium and magnesium being preferred. R is preferably a $C_{10}$-$C_{36}$ petroleum hydrocarbon group and/or mixtures of other materials such as olefin, olefin polymer, natural fats, fatty oils and waxes. The preferred equivalent weights of metal salts of organic sulfonates are in the range of about 200 to about 600.

Metal salts of organic sulfonates may be obtained by sulfonating various petroleum fractions or their mixtures with sulfuric acid, chlorosulfonic acid, sulfur trioxide and their mixtures. The petroleum hydrocarbons may be aliphatic, cyclic and/or aromatic. One such metal salt of an organic sulfonate may be produced, for example, by treating a mineral oil having a Saybolt Universal viscosity at about 39° C. of from about 400 to 540 seconds with fuming sulfuric acid, preferably in small increments. After a calculated amount of sulfuric acid has been added to the oil, the sludge which forms is removed and the acid-treated oil containing dissolved oil-soluble sufuric acid is neutralized with a solution of calcium hydroxide. The aqueous alkali solution is removed from the mixture and the calcium salts of petroleum sulfonic acid extracted with alcohol, the alcohol layer containing the sulfonates can be removed by distillation or by any other suitable means. Preparation of the petroleum sulfonates are well known in the literature and such techniques can be found in U.S. Pat. Nos. 2,395,713; 2,413,199; 2,414,773; 2,416,397; and if desired, the petroleum sulfonate may be purified by means disclosed in U.S. Pat. Nos. 2,236,993; 2,334,532; 2,357,866; 2,368,452 and 2,406,703. A teachings of these patents regarding the preparation and purification of petroleum sulfonates are hereby incorporated by reference in this application as suitable for similar use herein. For ease in incorporating the metal salt of the sulfonate complex which is a very hard solid into the composition, it is preferably employed as a dispersion in a non-volatile oil. Among numerous such oil which may be employed are mineral lubricating oils and synthetic lubricating oils. Commercially available dispersions of the petroleum sulfonate complex in oil are available, for example, from Witco Chemical Corporation, New York, N.Y., under the tradename of SACI (Severe Atmospheric Corrosion Inhibitor). Examples of such SACI materials which may be employed in the subject composition includes, but is not limited to, CI 51, CI 55 and SACI 200-A.

Preferred sulfonate complex/oil dispersions for use in this invention are those wherein the sulfonate complex comprises between about 40 and about 70 weight percent of the dispersion. More preferably the sulfonate complex comprises between about 50 and about 65 weight percent, most preferably about 50 weight percent of the sulfonate oil dispersion which may be employed in the composition of this invention.

As would be apparent to one skilled in the art, mixtures of various sulfonates as well as sulfonate dispersions could be employed herein.

The elastomer and metal salts of organic sulfonates are present in the mixture of Component A in amounts so as to provide between about 20 and 80 percent hydroxyl groups and between 80 and 20 percent sulfonate groups, based on the total of the hydroxyl groups and sulfonate groups present in the mixture.

POLYISOCYANATE CROSSLINKING AGENT

Component B of the expandable urethane sealant of this invention comprises a polyisocyanate, i.e., a compound having 2 or more, preferably 3 or more, reactive isocyanate groups per molecule. This polyisocyanate crosslinking agent is included in the compositions of the invention in an amount so as to provide between about 0.85 and about 1.15, more preferably between about 1.10 and 0.90, most preferably about 1.0 reactive isocyanate groups for each reactive functional group present in the composition either as a hydroxyl group on the elastomer or as a sulfonate group of the metal salts of organic sulfonates.

Polyisocyanates are well known in the art and numerous suitable isocyanates having 2 or more reactive isocyanate groups per molecule will be apparent to those skilled in the art. Among the many suitable polyisocyanates are aliphatic, cycloaliphatic and aromatic isocyanate compounds. Representative of the numerous isocyanates which may be employed are 1,5-naphthalene diisocyanate (NDI), 4,4'-diphenolmethane diisocyanate (MDI), polymethylene polyphenyl isocyanate (PAPI), 2,4 or 2,6 toluene diisocyanate (TDI), 1,6-hexamethylene diisocyanate (HDI), dimeryl diisocyanate (BDI), 2,4'-dicyclohexylmethane diisocyanate ($H_{12}MDI$), Xylylene diisocyanate (XDI), methylcyclohexyl diisocyanate (HTDI), etc.

Among the various isocyanates available for the formation of urethanes, isocyanates with more than two functional groups have been found to be desirable. Such a preferred isocyanate is a trifunctional product of 3 moles of 1,6-hexamethylene diisocyanate with 1 mole of water, as follows:

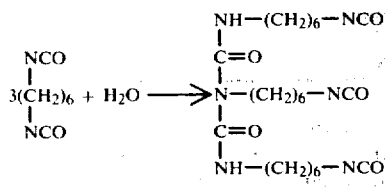

Such polyisocyanates are particularly preferable because they exhibit a low vapor pressure. Additionally, mixtures of polyisocyanates (with three or more functional groups) and diisocyanates have been found particularly useful in the subject composition.

It has been found that the liquid reactive elastomers and the metal salts of the sulfonates are able to react with polyisocyanates at elevated temperatures to form the expandable urethane foam without the addition of catalysts or blowing agents. However, when desired, although not preferable, catalysts for the isocyanate curing reaction may be incorporated into the composition. Suitable catalyst which may be employed include tertiary amine catalysts such as N,N-Diethylcyclohexylamine and N-Methylmorpholine; metallic organic catalyst such as sodium o-phenylphenate, potassium oleate, and tetra-(2-ethyl hexyl) titanate.

When polyisocyanates are mixed with metal salts of organic sulfonates and heated at elevated temperatures, some crosslinking reactions are observed. The chemistry of these reactions are not fully understood, but gaseous substances are evolved from the crosslinking reactions. These gaseous substances act as blowing agents in the formation of the urethane foam of this invention. However, neither the validity of these observations nor their understanding is necessary for the practice of the subject invention.

OPTIONAL COMPONENTS INCLUDING PIGMENTS AND FILLERS

In addition to the above discussed components, other materials such as pigments, both hiding pigments and extending pigments, inert fillers, fire retardants and antioxidants may also be included in the expandable urethane sealant composition of this invention. When included these materials may additionally comprise up to about 15 weight percent based on the total weight of the elastomer, sulfonate (dispersion) and polyisocyanate. Pigments and fillers commonly used in such compositions include titanium dioxide, antimony sulfide, carbon black, calcium carbonate, aluminium powder, mica, powder glass, clay, and ground silica. Flame retardants available to impart fire retardants to sealant formulations include such materials as antimony oxide, alumina-trihydrate, and phosphorous containing compounds. In order to increase the resistance of urethane sealants to oxidation, antioxidants such as phenols, aromatic amines, or condensation products of aminophenol with aldehyde or thio compounds may be incorporated in the composition. These optional components are generally incorporated into the component A mixture.

Other such optional components which may be included in this composition would be well known to one skilled in the art.

The invention will be further understood by referring to the following detailed examples. It should be understood that the specific examples are presented by way of illustration and not by way of limitation. Unless otherwise specified, all reference to "parts" is intended to mean parts by weight.

EXAMPLE 1

|  | Parts by Weight | Equivalent |
|---|---|---|
| Component A: | | |
| Hydroxyl-terminated butadiene/acrylonitrile copolymer (Hycar 1300 × 29, OH equivalent weight 2000) | 45 | 0.023 |
| Calcium salt of petroleum sulfonate dispersion in 50% solids in non-volatile oil; CI-51 (Sulfonate equivalent weight 340 based on solids) | 40 | 0.059 |
| Component B: | | |
| Desmodur N-100 (—NCO equivalent weight 200) available from Mobay Chemical Corp. Pittsburgh, Pa. | 15 | 0.075 |

In a mixing tank equipped with a mechanical mixer, the materials of Component A are mixed so as to be homogeneous. Component B is a trifunctional isocyanate with the chemical structure of:

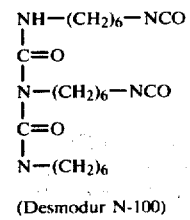

(Desmodur N-100)

Shortly before application, component B is added to Component A and the mixture is blended homogeneously. This mixture has a workable life of at least 24 hours at room temperature. To a steel panel coated with electro-coat primer, the expandable urethane sealant composition is applied with a putty knife at a thickness of 20 mils. The panel is baked at 150° C. for 10 minutes and the coating is converted into a foam type sealant. This foam type sealant is light yellow in color and resilient. The expandable sealant has good adhesion, excellent impact and abrasion resistance and outstanding sound-deadening property. A panel coated with expandable urethane sealant was tested in Gravolometer and no chipping was observed.

EXAMPLE 2

The same composition and same procedure is repeated as in Example 1 except the mixture is applied on a cold-rolled steel panel covered with a thin film of mill oil and lubricant. After baking at 150° C. for 10 minutes, the urethane foam sealant has good adhesion to the oily steel surface, excellent sound deadening properties and impact and abrasion resistance.

EXAMPLE 3

The same compositions as Example 1 is repeated except the mixture is filled into the space of about ¼ inch between two cold-rolled steel panels. After baking at 150° C. for 10 minutes, the panels are joined with foam type sealant. The sealant has good adhesion and elasticity.

EXAMPLE 4

|  | Parts by Weight | Equivalents |
|---|---|---|
| Component A: |  |  |
| Hycar 1300 × 29 | 40 | 0.02 |
| Calcium salt of petroleum sulfonate dispersion 70% in non-volatile oil (Sulfonate equivalent weight 340 based on solids) | 40 | 0.08 |
| Component B: |  |  |
| Desmodur N-100 | 20 | 0.10 |

The same procedure as in Example 1 is repeated. The resulting expandable urethane sealant possesses good adhesion, abrasion and impact resistance and sound deadening properties.

EXAMPLE 5

|  | Parts by Weight | Equivalents |
|---|---|---|
| Component A: |  |  |
| Hycar 1300 × 29 | 50 | 0.025 |
| Calcium salt of petroleum sulfonate dispersion 50% solids in non-volatile oil | 31 | 0.064 |
| Aluminum pigment | 3 |  |
| Aluminatrihydrate | 7 |  |
| Component B: |  |  |
| Desmodur N-100 | 19 | 0.095 |

The same procedure as in Example 1 is repeated except that the mixture is filled into the space between two steel panels. After baking at 180° C. for 5 minutes, the panels being joined with a gray color foam type sealant.

EXAMPLE 6

|  | Parts by Weight | Equivalents |
|---|---|---|
| Component A: |  |  |
| Hycar 1300 × 29 | 40 | 0.020 |
| Calcium salt of petroleum sulfonate dispersion 50% solids in non-volatile oil | 46 | 0.068 |
| Carbon black | 5 |  |
| Component B: |  |  |
| Desmodur N-100 Toluene diisocyanate (—NCO equivalent weight 87) | 10 | 0.050 |

The same procedure as in Example 5 is repeated. A black color expandable sealant is obtained.

EXAMPLE 7

|  | Parts by Weight | Equivalents |
|---|---|---|
| Component A: |  |  |
| Hycar 1300 × 29 | 55 | 0.028 |
| Calcium salt of petroleum sulfonate (40% solids in non-volatile oil) Sulfonate equivalent weight 340 based on solids | 32 | 0.038 |
| Aluminum pigment | 3 |  |
| Aluminatrihydrate | 7 |  |
| Component B: |  |  |
| Desmodur N-100 | 13 | 0.065 |

The procedure of Example 5 is repeated except that the mixture is filled into the space between two steel panels and baked at 180° C. for 5 minutes. The panels are joined with a gray color foam type sealant.

EXAMPLE 8

|  | Parts by Weight | Equivalents |
|---|---|---|
| Component A: |  |  |
| Hycar 1300 × 29 | 90 | 0.045 |
| Aluminum pigment | 3 |  |
| Aluminatrihydrate | 7 |  |
| Component B: |  |  |
| Desmodur N-100 | 10 | 0.050 |

In this Example, no metal salt of petroleum sulfonate is used. After baking at 150° C. for 10 minutes, the polyisocyanate is found to react with the hydroxyl terminated butadiene/acrylonitrile copolymer to form a crosslinked product, but no foam is formed, and therefore the sealant is not resilient and its sound deadening properties are poor.

EXAMPLE 9

| Ingredients: | Parts by Weight |
|---|---|
| Hycar 1300 × 29 | 50 |
| Calcium salt of petroleum sulfonate (in 50% non-volatile oil) | 50 |

In this Example, no polyisocyanate is included in the composition. After baking at 150° C. for 25 minutes, the sealant is still in a putty form and is soft and tacky. It seems no chemical reaction occurred.

INDUSTRIAL APPLICABILITY

This invention relates to compositions for making urethane foam without the use of conventional blowing agents such as water or volatile solvents. This expandable urethane composition can be adapted for use as sealants for automotive application. These sealants offers good adhesion to oily surface substrates and superior sound insulation effects. They are useful in automotive applications such as sealing the hem flange of hood and door assemblies for corrosion protection, sealing the floor pan and roof panel for sound insulation. Other applications in, for example, transportation and construction would be apparent to one in the art.

I claim:

1. A two component expandable urethane sealant composition comprising liquid reactive elastomer and polyisocyanate, characterized in that said composition comprises:
   (A) a mixture of:
      (i) liquid reactive elastomer (a) having a number average molecular weight ($\overline{M}_n$) between about 1500 and about 15,000, (b) containing pendant hydroxyl groups, and (c) being liquid at between about 20° and about 25° C.; and
      (ii) metal salts of organic sulfonates having the formula:

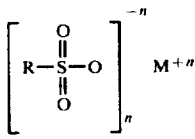

wherein R is selected from $C_8$–$C_{36}$ hydrocarbon groups and M is a metal ion wherein n=1, 2 or 3; and
   (B) polyisocyanate having at least two isocyanate groups per molecule, and
   wherein said elastomer and said metal salts of organic sulfonates are present in said mixture in amounts so as to provide between about 20 and about 80 percent hydroxyl groups and between about 80 and about 20 percent sulfonate groups based on the total of said hydroxyl groups and said sulfonate groups; and
   wherein said polyisocyanate is included in said composition in an amount so as to provide between about 0.85 and 1.15 reactive isocyanate groups for each reactive functional group present in said composition either as a hydroxyl group on said liquid reactive elastomer or as a sulfonate group of said metal salts of organic sulfonates.

2. A two component expandable urethane sealant composition according to claim 1, wherein said liquid reactive elastomer has a number average molecular weight of between about 2000 and about 5000.

3. A two component expandable urethane sealant composition according to claim 2, wherein said elastomer contains about two hydroxyl groups per molecule.

4. A two component expandable urethane sealant composition according to claim 1, wherein said R is a $C_{10}$–$C_{36}$ petroleum group.

5. A two component expandable urethane sealant composition according to claim 1 or 4, wherein M is selected from the group consisting of calcium, magnesium, sodium and barium.

6. A two component expandable urethane sealant composition according to claim 1, wherein the equivalent weight of said metal salts of said organic sulfonates is between about 200 and about 600.

7. A two component expandable urethane sealant composition according to claim 1, wherein said metal salts of said organic sulfonates are included in said composition as a dispersion in diluent oil.

8. A two component expandable urethane sealant composition according to claim 7, wherein said sulfonate comprise between about 40 and about 70 weight percent of said dispersion.

9. A two component expandable urethane sealant composition according to claim 8, wherein said sulfonates comprise between about 50 and 60 weight percent of said dispersion.

10. A two component expandable urethane sealant composition according to claim 9, wherein said sulfonates comprise about 50 weight percent of said dispersion.

11. A two component expandable urethane sealant composition according to claim 1, wherein said polyisocyanate is included in said composition so as to provide between about 1.10 and about 0.90 reactive isocyanate groups for each reactive functional group present in said composition either as hydroxyl groups on said liquid reactive elastomer or as a sulfonate groups of said metal salts of organic sulfonates.

12. A two component expandable urethane sealant composition according to claim 11, wherein said polyisocyanate is included in said composition in an amount so as to provide about 1.0 reactive isocyanate groups for each reactive functional group present in said composition either as a hydroxyl groups on said liquid reactive elastomer or as a sulfonate groups of said metal salts of organic sulfonates.

13. A two component expandable urethane sealant composition according to claim 1 or 11, wherein said polyisocyanate has three or more reactive isocyanate groups per molecule.

14. A two component expandable urethane sealant composition according to claim 1, wherein said polyisocyanate comprises a mixture of diisocyanate and polyisocyanate having at least three isocyanate groups.

15. A two component expandable urethane sealant composition according to claim 1, wherein said composition further comprises up to about 15 weight percent fibers and/or pigments based on the total weight of said elastomer, said sulfonate, diluent oil, and said polyisocyanate.

16. A two component expandable urethane sealant composition comprising liquid reactive elastomer and polyisocyanate which, exclusive of pigments, fillers and other non-reactive components characterized in consisting essentially of:
   (A) a mixture of:
      (i) liquid reactive elastomer (a) having a number average molecular weight ($\overline{M}_n$) between about 1500 and 15,000, (b) containing about two pendant hydroxyl groups per molecule, and (c) being liquid at between about 20° and about 25° C.; and
      (ii) dispersion of metal salts of organic sulfonates in nonvolatile diluent oil, said sulfonates having the formula:

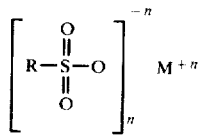

wherein R is selected from $C_8$–$C_{36}$ hydrocarbon groups and M is a metal ion wherein n=1, 2 or 3, and said sulfonates comprising between about 40 and about 70 weight percent of said dispersion; and (B) polyisocyanate having at least two isocyanate groups per molecule, and wherein said elastomer and said metal salts of organic sulfonates are present in said mixture in amounts so as to provide between about 20 and about 80 percent hydroxyl groups and between about 80 and about 20 percent sulfonate groups based on the total of said hydroxyl groups and said sulfonate groups; and wherein said polyisocyanate is included in said composition in an amount so as to provide between about 0.85 and 1.15 reactive isocyanate groups for each reactive functional group present in said composition either as a hydroxyl group on said liquid reactive elastomer or as a sulfonate group of said metal salts of organic sulfonates.

17. A two component expandable urethane sealant composition according to claim 16, wherein said elastomer has a molecular weight between about 2000 and 5000.

18. A two component expandable urethane sealant composition according to claim 16, wherein said R is a $C_{10}$–$C_{36}$ petroleum group.

19. A two component expandable urethane sealant composition according to claim 16, wherein M is selected from calcium or magnesium.

20. A two component expandable urethane sealant composition according to claim 16, wherein the equivalent weight of said metal salts of said organic sulfonates is between about 200 and about 600.

21. A two component expandable urethane sealant composition according to claim 16, wherein said sulfonates comprise between about 50 and 65 weight percent of said dispersion.

22. A two component expandable urethane sealant composition according to claim 16, wherein said polyisocyanate contains at least about 3 reactive isocyanate groups per molecule.

23. A two component expandable urethane sealant composition according to claim 16, wherein said polyisocyanate comprises a mixture of diisocyanates and polyisocyanates having at least about three isocyanate groups per molecule.

24. A two component expandable urethane sealant composition according to claim 16, wherein said polyisocyanate is included in said composition in an amount so as to provide between about 1.10 and about 0.90 reactive isocyanate groups for each reactive functional group present in said composition either as hydroxyl group of said liquid reactive elastomer or as a sulfonate group of said metal salts of organic sulfonates.

* * * * *